United States Patent
Jung et al.

(10) Patent No.: US 10,660,021 B2
(45) Date of Patent: May 19, 2020

(54) SIDELINK UE INFORMATION REPORTING METHOD BY UE IN WIRELESS COMMUNICATION SYSTEM AND UE USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 15/751,579

(22) PCT Filed: Aug. 12, 2016

(86) PCT No.: PCT/KR2016/008882
§ 371 (c)(1),
(2) Date: Feb. 9, 2018

(87) PCT Pub. No.: WO2017/026836
PCT Pub. Date: Feb. 16, 2017

(65) Prior Publication Data
US 2018/0242228 A1    Aug. 23, 2018

Related U.S. Application Data

(60) Provisional application No. 62/203,964, filed on Aug. 12, 2015.

(51) Int. Cl.
*H04W 48/14* (2009.01)
*H04L 5/00* (2006.01)
*H04W 24/10* (2009.01)
*H04W 76/14* (2018.01)
(Continued)

(52) U.S. Cl.
CPC ........... *H04W 48/14* (2013.01); *H04L 5/0053* (2013.01); *H04W 8/005* (2013.01); *H04W 8/24* (2013.01);
(Continued)

(58) Field of Classification Search
CPC ..... H04W 48/14; H04W 76/14; H04W 8/005; H04W 8/24; H04W 24/10; H04W 48/08;
(Continued)

(56) References Cited

U.S. PATENT DOCUMENTS

2013/0242765 A1    9/2013   Kubota et al.
2014/0348081 A1*  11/2014   Liao ................... H04L 67/16
                                                          370/329
(Continued)

FOREIGN PATENT DOCUMENTS

WO    2014/181272 A1    11/2014
WO    2015/065113 A1    5/2015

OTHER PUBLICATIONS

3GPP, "Further clarifications to Sidelink UE Information procedure," 3GPP TS 36.331 Ver. 12.5.0, Apr. 2009 (Year: 2009).*
(Continued)

*Primary Examiner* — Awet Haile
*Assistant Examiner* — Nevena Zecevic Sandhu
(74) *Attorney, Agent, or Firm* — Dentons US LLP

(57) ABSTRACT

Provided are a sidelink UE information reporting method by a UE in a wireless communication system and a UE using same. In the method, a threshold value is received from a network and sidelink UE information is transmitted only when the variation in the number of distinguished discovery messages to be transmitted is equal to or higher than the threshold value.

12 Claims, 19 Drawing Sheets

(51) Int. Cl.
*H04W 8/00* (2009.01)
*H04W 8/24* (2009.01)
*H04W 72/04* (2009.01)
*H04W 92/18* (2009.01)
*H04W 48/20* (2009.01)
*H04W 88/04* (2009.01)

(52) U.S. Cl.
CPC ....... *H04W 24/10* (2013.01); *H04W 72/0406* (2013.01); *H04W 76/14* (2018.02); *H04W 48/20* (2013.01); *H04W 88/04* (2013.01); *H04W 92/18* (2013.01)

(58) Field of Classification Search
CPC .. H04W 72/04; H04W 72/0406; H04W 88/04
See application file for complete search history.

(56) References Cited

U.S. PATENT DOCUMENTS

| | | | |
|---|---|---|---|
| 2015/0009910 A1* | 1/2015 | Ryu | H04W 72/04 370/329 |
| 2015/0043448 A1 | 2/2015 | Chatterjee et al. | |
| 2015/0304262 A1* | 10/2015 | Guan | H04W 8/005 709/206 |
| 2016/0278121 A1* | 9/2016 | Agiwal | H04W 8/005 |
| 2016/0302137 A1* | 10/2016 | Escott | H04W 48/16 |
| 2017/0064534 A1* | 3/2017 | Loehr | H04W 72/04 |
| 2018/0035408 A1* | 2/2018 | Zhang | H04W 76/14 |

OTHER PUBLICATIONS

3GPP, "Sidelink terminology alignment in TS 36.300," 3GPP TS 36.300 Ver. 12.5.0, Apr. 2009 (Year: 2009).*
LTE; Evolved Universal Terrestrial Radio Access (E-UTRA); Radio Resource Control (RRC); Protocol specification (3GPP TS 36.331 version 12.6.0 Release 12 ), ETSI TS 136 331 V12.6.0 (Jul. 2015), Sections 5.10.2.2-5.10.2.3.
3rd Generation Partnership Project; Technical Specification Group Radio Access Network; Evolved Universal Terrestrial Radio Access (E-UTRA); User Equipment (UE) procedures in idle mode (Release 8), 3GPP TS 36.304 V8.5.0 (Mar. 2009).

* cited by examiner

SIDELINK UE INFORMATION REPORTING METHOD BY UE IN WIRELESS COMMUNICATION SYSTEM AND UE USING SAME

CROSS-REFERENCE TO RELATED APPLICATIONS

This application is the National Stage filing under 35 U.S.C. 371 of International Application No. PCT/KR2016/008882, filed on Aug. 12, 2016, which claims the benefit of U.S. Provisional Application No. 62/203,964 filed on Aug. 12, 2015, the contents of which are all hereby incorporated by reference herein in their entirety.

BACKGROUND OF THE INVENTION

Field of the Invention

The present invention relates to wireless communication. More particularly, the present invention relates to a method of reporting sidelink user equipment (UE) information by a user equipment in a wireless communication system, and a user equipment performing the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

The D2D operation is referred to as a ProSe (Proximity Service) operation in that the D2D operation is a signal transmission/reception between adjacent devices. The D2D operation may have various advantages. For example, a D2D user equipment has high data rate and low latency and can communicate data. In addition, D2D operation can distribute traffic to the base station. When the D2D user equipment acts as a repeater, the device may also serve to extend the coverage of the base station.

Meanwhile, a D2D user equipment may operate as a user equipment that acts as a repeater to connect a sidelink and a cellular link. The sidelink is a link between a user equipment and a user equipment, and a cellular link is a link between a user equipment and a network. A D2D user equipment acting as a repeater is called a relay user equipment. For example, when a first user equipment in a network coverage communicates with a second user equipment outside the network coverage, D2D operation is available. In this connection, there may be a D2D operation limited between the first and second user equipments. For example, there may be an operation in which the second user equipment directly transmits data to the first user equipment. Further, there may be an operation in which the second user equipment may transmit data to the network through the first user equipment. Alternatively, there may be an operation in which the network transmits data to the second user equipment via the first user equipment. In other words, a user equipment may act as a repeater between other user equipments and the network. In this case, the user equipment is referred to as a relay user equipment.

Meanwhile, the relay user equipment may be required to receive allocation for transmission resources from the base station to transmit signals related to the relay service. For this purpose, the relay user equipment may inform the base station of the number of separate messages it wishes to transmit via the sidelink user equipment (UE) information or the sidelink UE information. The sidelink user equipment (UE) information is a message used to inform the base station about the sidelink. The sidelink user equipment (UE) information may include, for example, parameters informing the number of resources the user equipment requests per particular period. The parameters may be determined according to the number of separate discovery messages to be transmitted by the user equipment. That is, the user equipment implicitly informs the base station of the number of separate discovery messages it wishes to transmit, and the base station allocates the appropriate resources based on this information. Although a relay user equipment has been illustrated herein to do this operation, it is not limited thereto. All user equipments that want to send a discovery message may need to do this operation.

However, if this operation is to be performed each time the number of separate messages to be transmitted by the user equipment is changed, this may be a problem when the number of the messages frequently changes. That is, whenever the number of messages changes, the user equipment must transmit the sidelink user equipment (UE) information, which results in inefficient and wasteful of resources.

SUMMARY OF THE INVENTION

The technical purpose to be solved by the present invention is to provide a method of reporting sidelink user equipment (UE) information by a user equipment in a wireless communication system, and a user equipment performing the method.

In one aspect, provided is a method for reporting sidelink user equipment (UE) information by a user equipment in a wireless communication system. The method includes receiving, by the user equipment, a threshold value from a network and only when change in a number of separate discovery messages to be transmitted by the user equipment is equal to or greater than the threshold value, transmitting, by the user equipment, sidelink user equipment (UE) information to the network.

The threshold value may be used as a condition for determining whether or not the user equipment should transmit the sidelink user equipment (UE) information.

If a number of discovery messages to be transmitted by the user equipment at a first time point is K1, a number of discovery messages to be transmitted by the user equipment at a second time point is K2 and the threshold value is defined as N_low and N_high, the sidelink user equipment (UE) information is not transmitted by the user equipment when (K1−N_low)<K2<(K1+N_high).

The sidelink user equipment (UE) information may include information (discTxResourceReq) indicating a number of resources required for the user equipment to transmit a sidelink discovery signal in each discovery period.

The information (discTxResourceReq) may be associated with a number of separate discovery messages to be transmitted by the user equipment.

The threshold value may be received via system information.

In another aspect, provided is a user equipment. The user equipment includes a radio frequency (RF) unit configured for transmitting and receiving a radio signal and a processor coupled to the RF unit. The processor is configured for: controlling the RF unit to receive a threshold value from a network and only when change in a number of separate discovery messages to be transmitted by the user equipment is equal to or greater than the threshold value, controlling the RF unit to transmit sidelink user equipment (UE) information to the network.

According to the present invention, when the number of separate messages to be transmitted is changed within a certain range, the user equipment may be configured to not transmit the sidelink user equipment (UE) information. Therefore, even when the number of the messages is frequently changed, but when the number is changed within a certain range, the user equipment can reduce the number of transmissions of the sidelink user equipment (UE) information. As a result, power consumption of the user equipment can be reduced, and waste of radio resources can be prevented.

DESCRIPTION OF EXEMPLARY EMBODIMENTS

Figure 1:
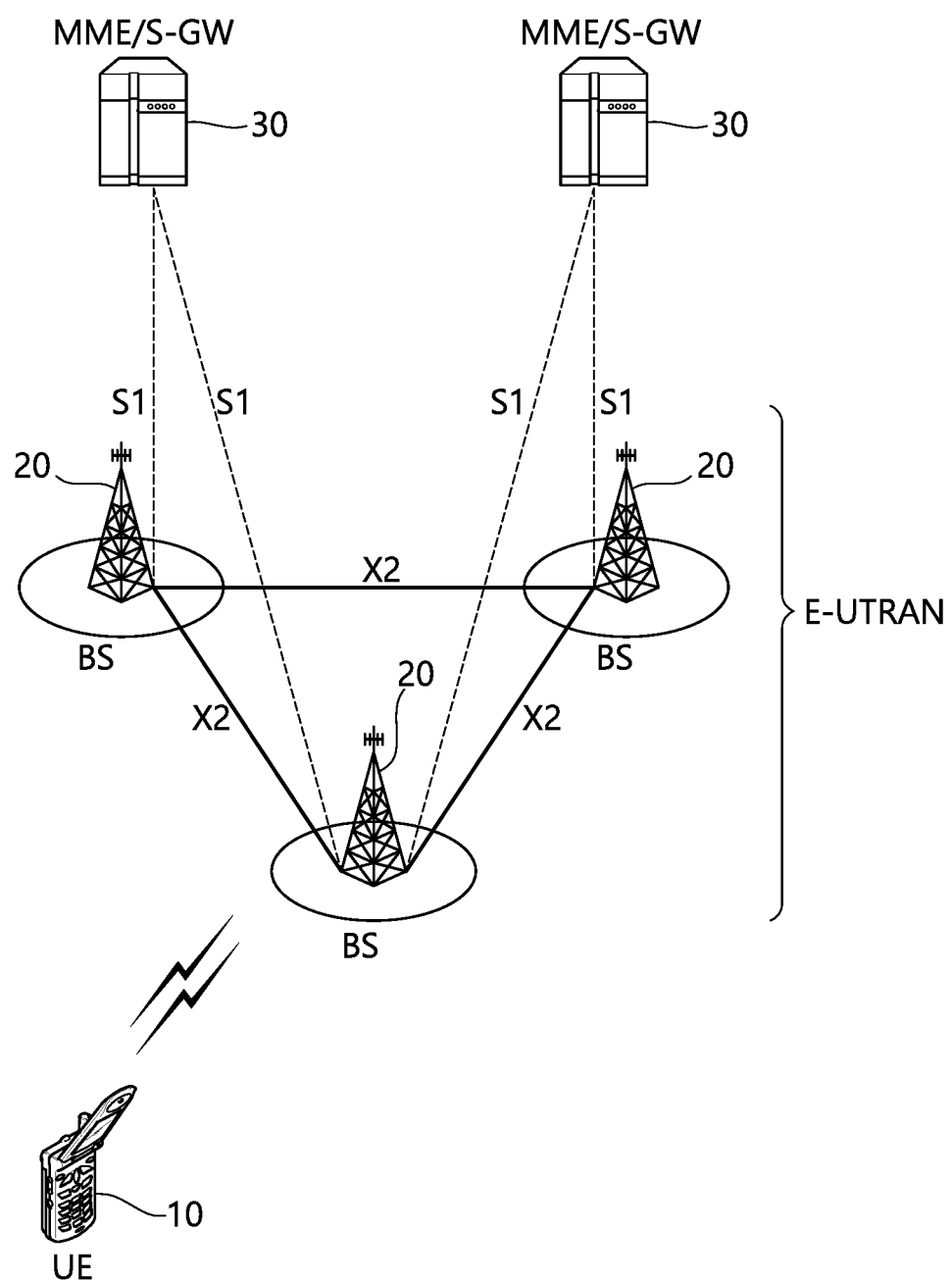
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
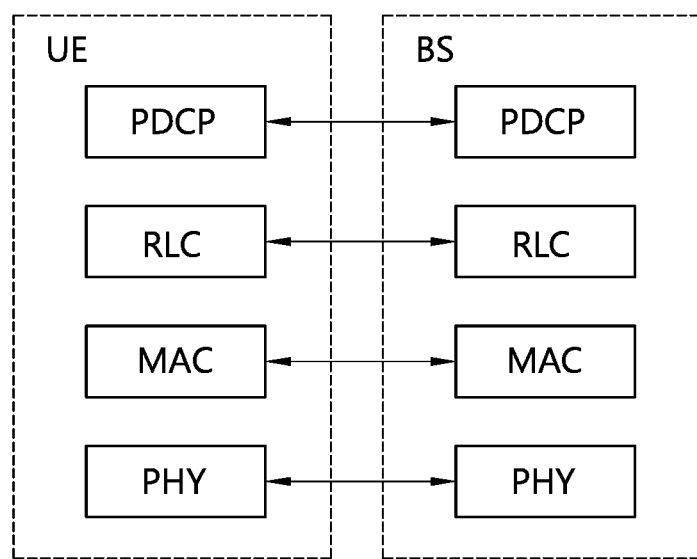
FIG. 2 is a diagram showing a wireless protocol architecture for a user plane.
Figure 3:
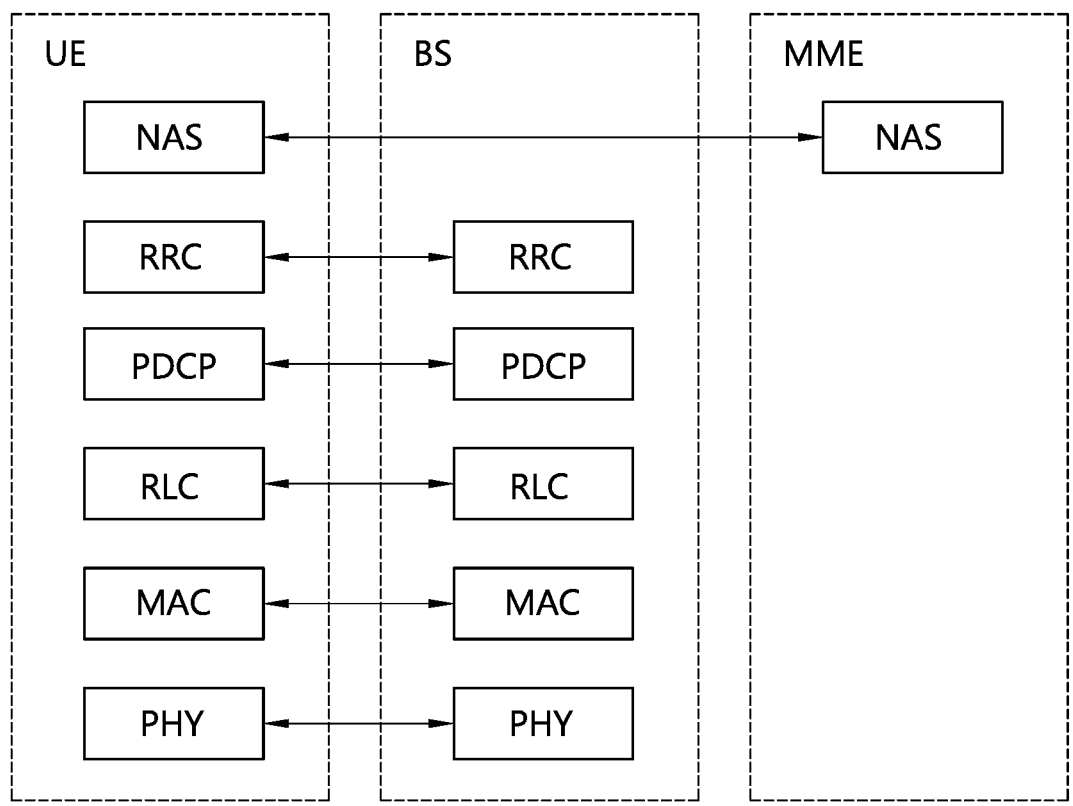
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM- CONNECTED state. The MME in the ECM-IDLE state becomes the ECM-CONNECTED state when it establishes 51 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIBS. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
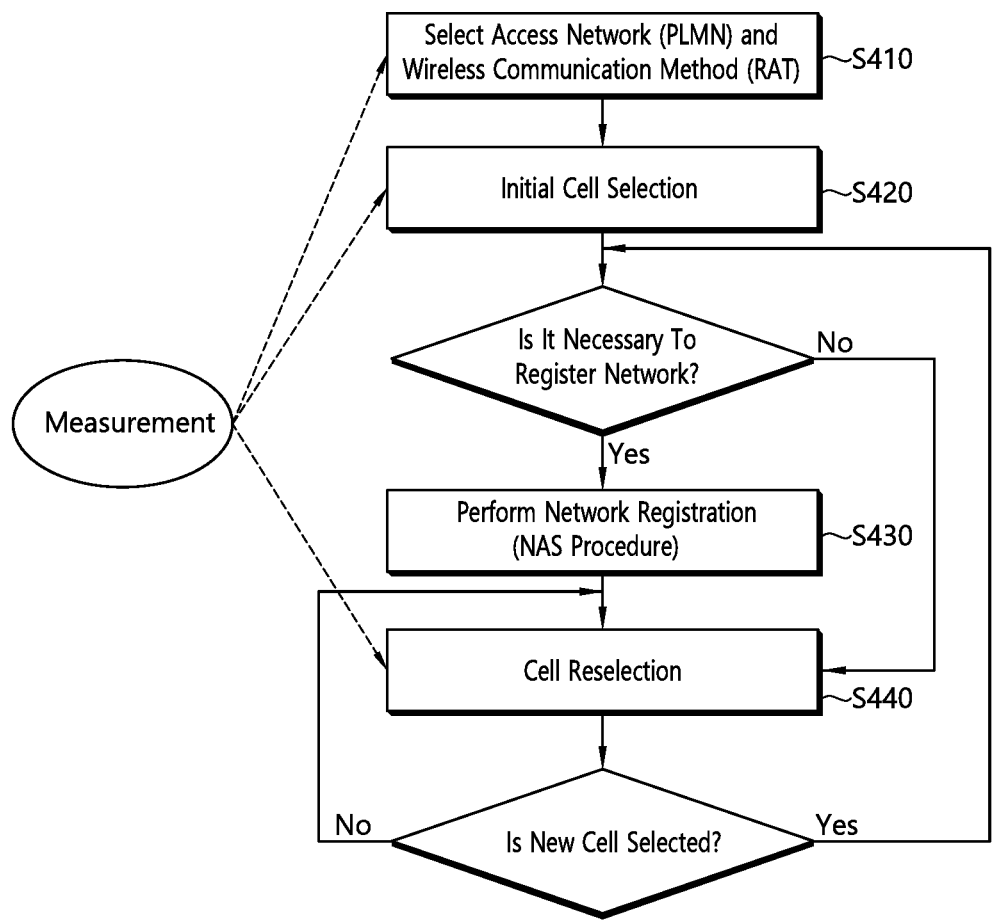
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
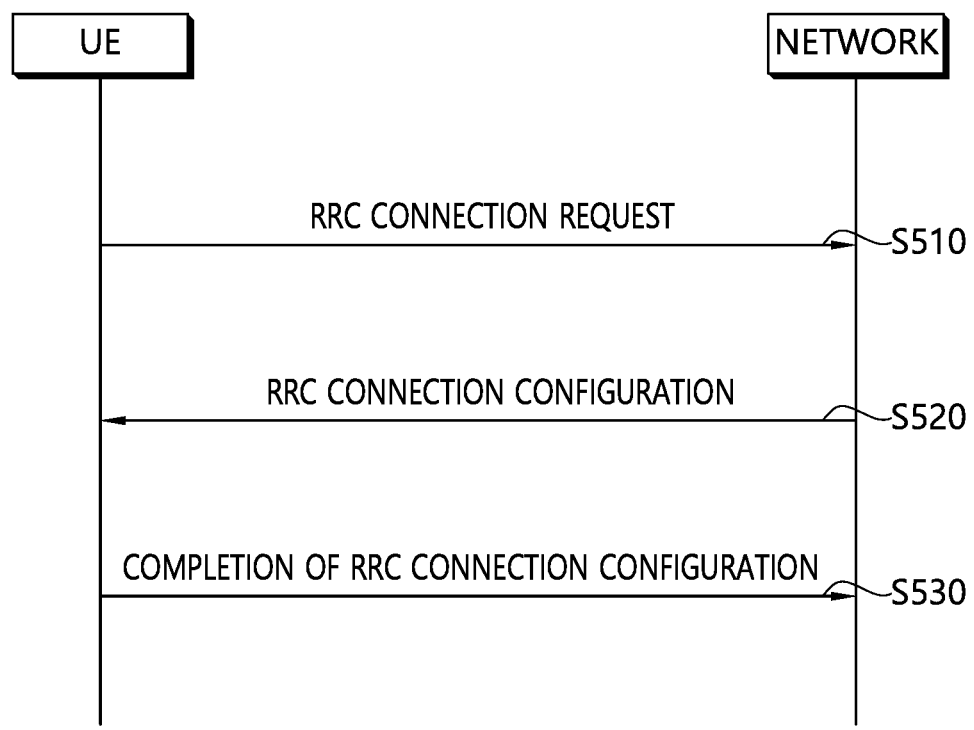
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
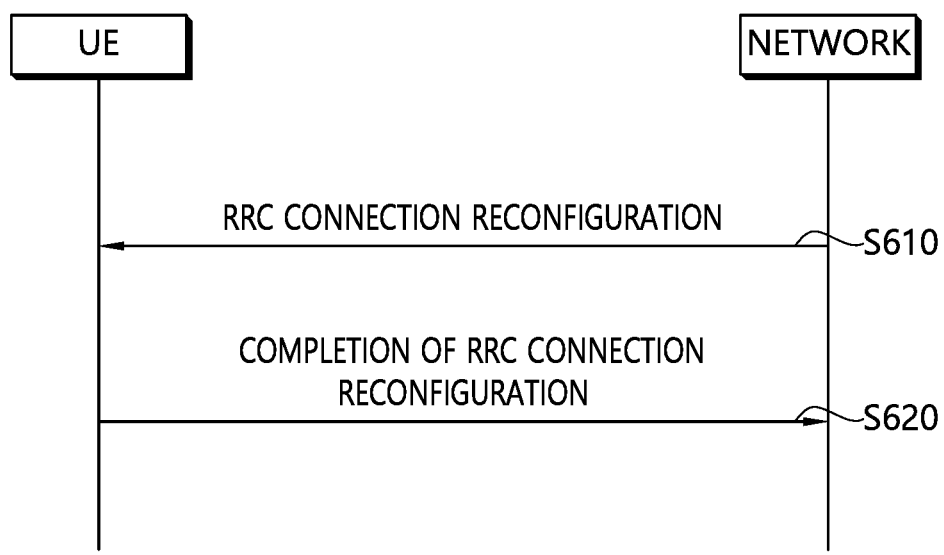
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$Srxlev > 0$ AND $Squal > 0$ where $Srxlev = Q_{rxlevmeas} - (Q_{rxlevmin} + Q_{rxlevminoffset}) - P_{compensation}$ $Squal = Q_{qualmeas} - (Q_{qualmin} + Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevmmoffset}$ and $Q_{qualminoffset}$ may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Q\text{meas},s + Q\text{hyst}, Rn = Q\text{meas},s - Q\text{offset}$$ [Equation 2]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
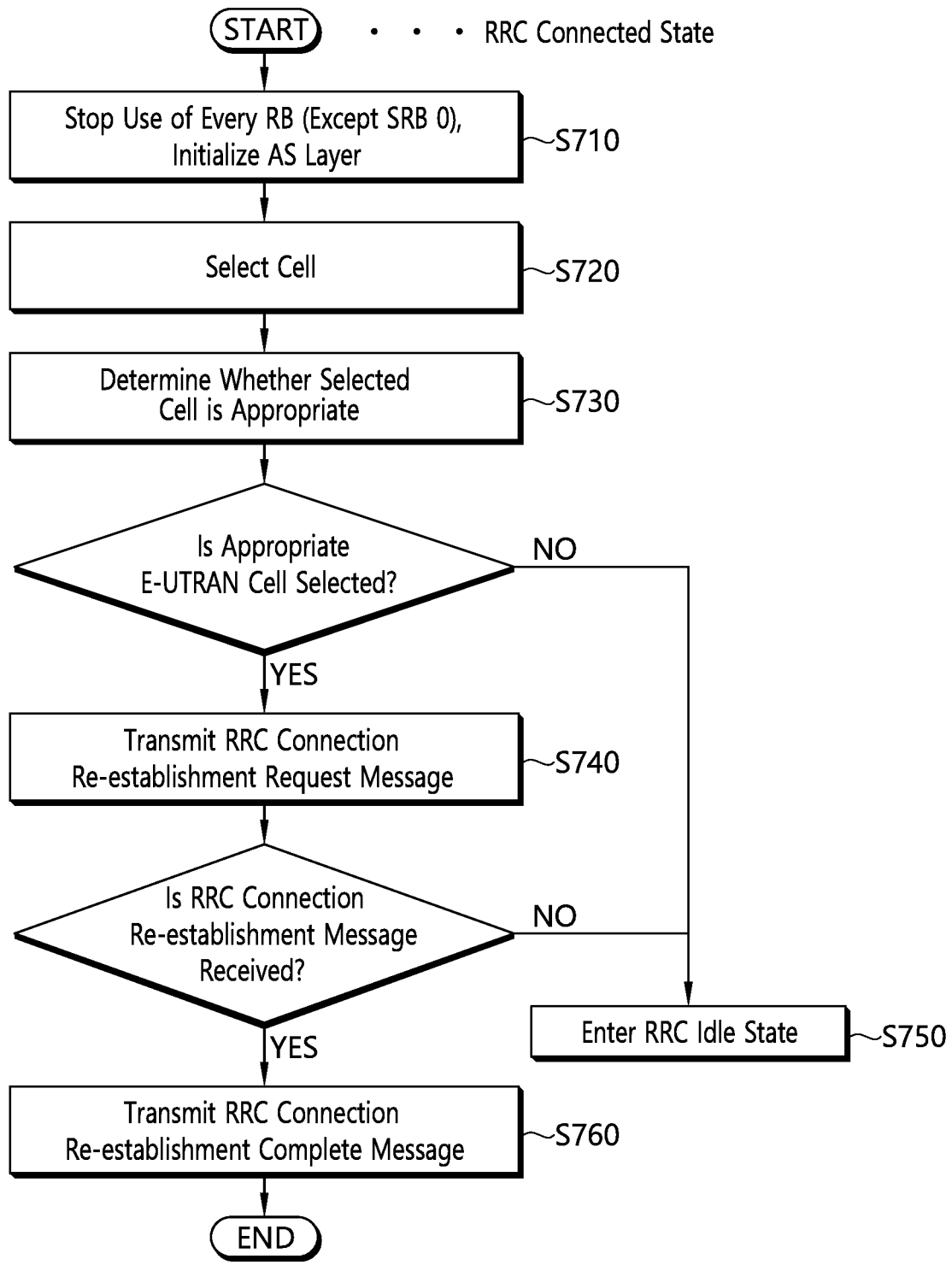
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
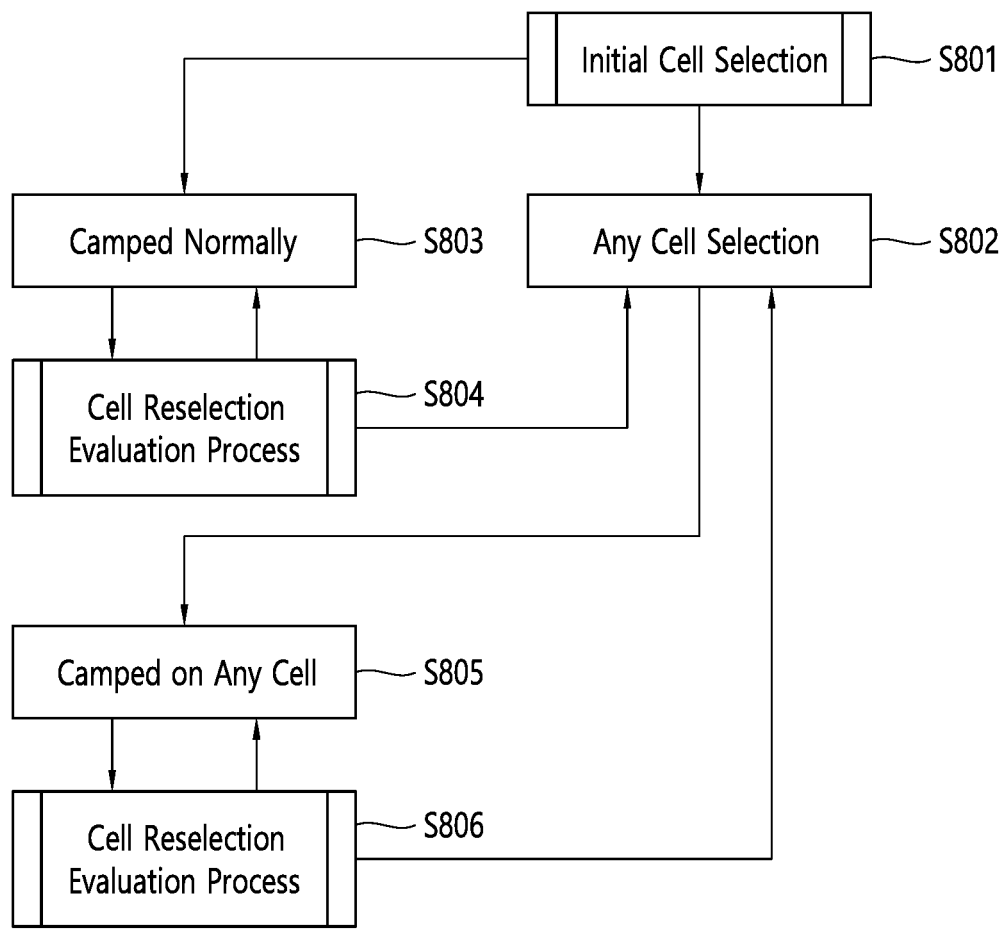
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
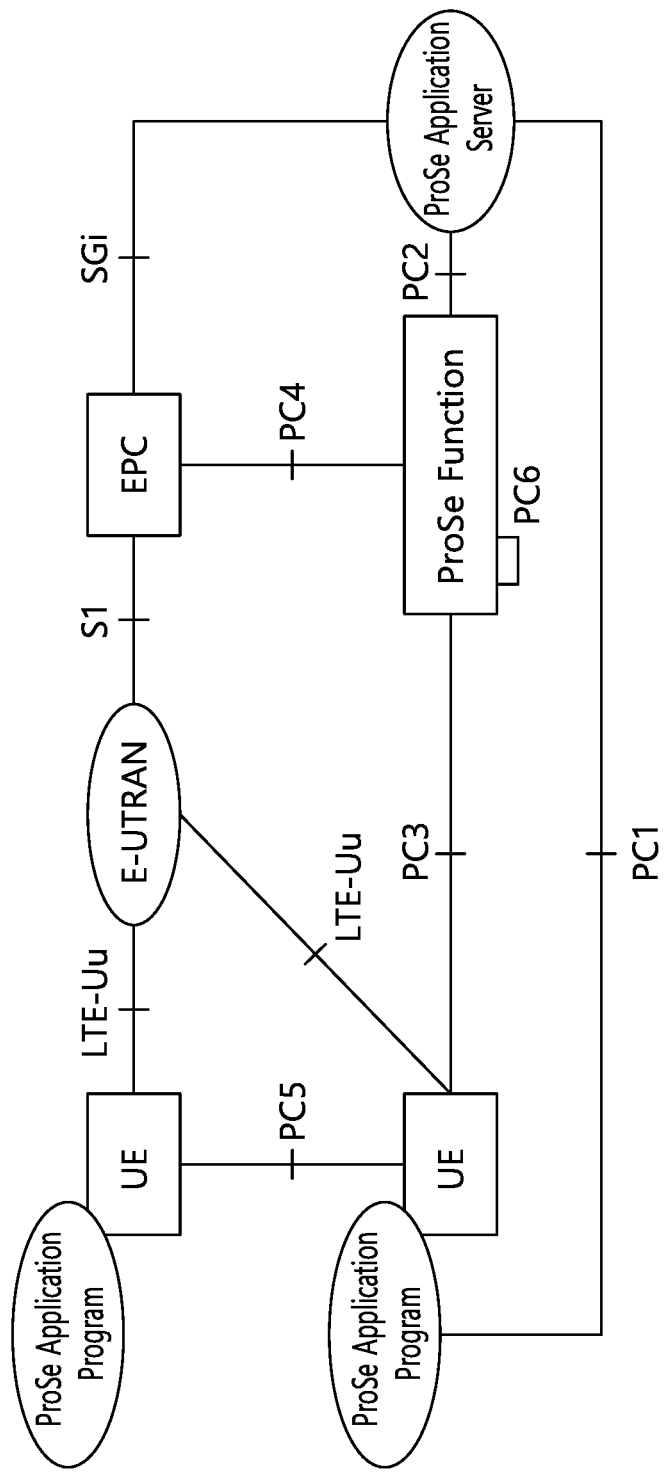
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
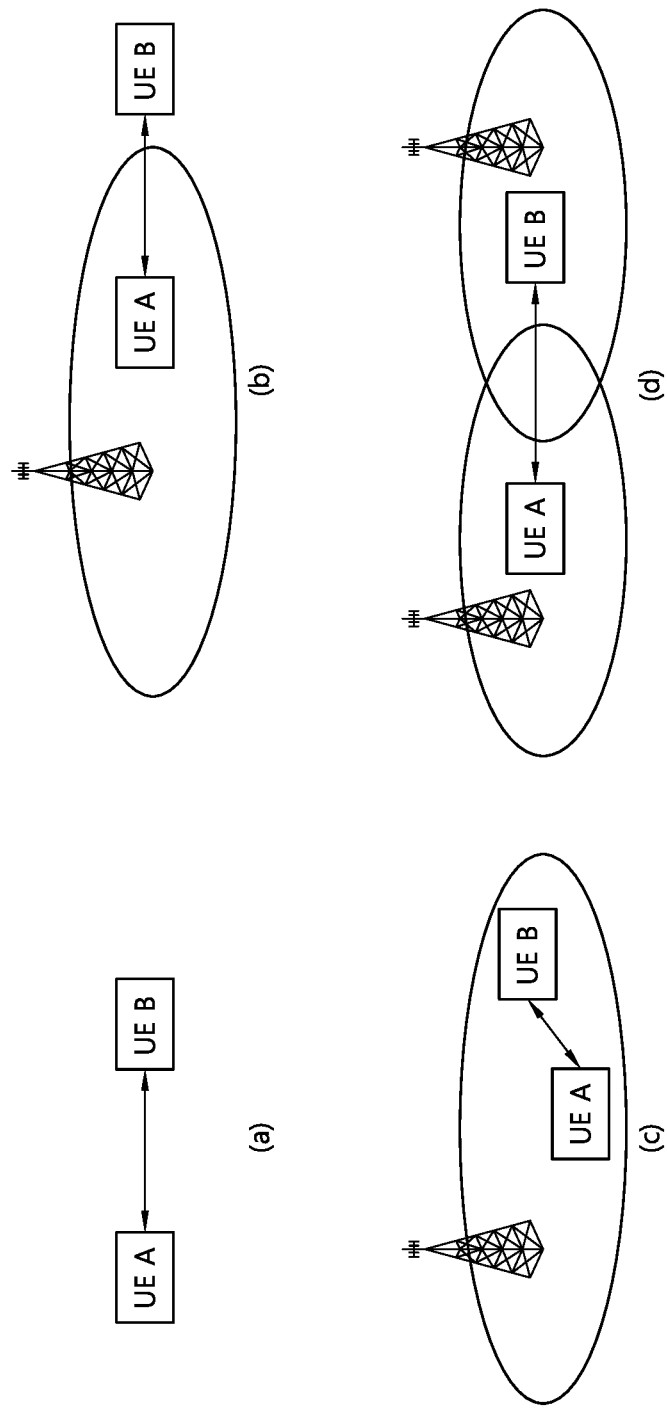
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
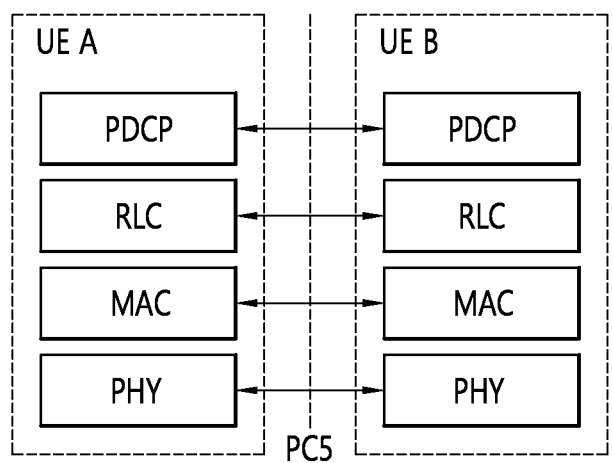
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
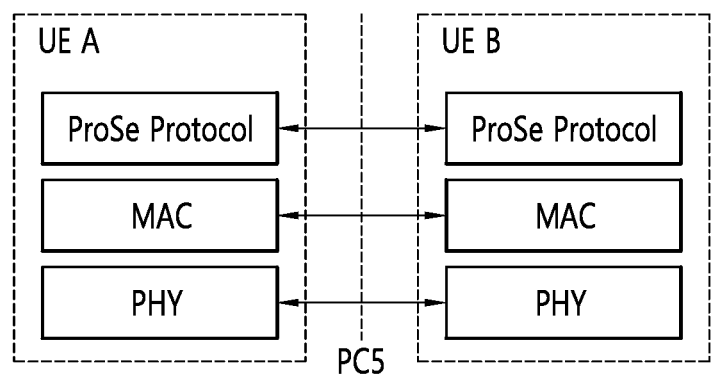
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

In the following, sidelink may refer to the interface between user equipments for D2D communication and D2D discovery. The sidelink corresponds to the PC5 interface described above. The channel defined/used by the sidelink is the Physical Sidelink Control Channel: PSCCH. A control channel that is used to broadcast the most basic system information for D2D communication is the Physical Sidelink Broadcast Channel (PSBCH). Also, the channel used for transmitting the D2D discovery signal may be defined as a Physical Sidelink Discovery Channel (PSDCH). The D2D synchronization signal may be referred to as a SideLink Synchronization Signal (SLSS) or a D2D Synchronization Signal (D2DSS).

In the LTE-A system (Rel-12, 13 or higher), the D2D communication user equipment is configured to transmit the PSBCH and the SLSS together or to transmit only the SLSS. Also, in LTE-A system, S-RSRP (Sidelink RSRP) is newly defined to synchronize between user equipments in D2D communication. In other words, when user equipments want to communicate in D2D, S-RSRP thereof may be measured. It is possible to synchronize with each other between user equipments having a value higher than a certain S-RSRP value, and then perform D2D communication between them. In this connection, S-RSRP may be measured from the demodulation reference signal: DM-RS on the PSBCH. However, for D2D relay operation, the S-RSRP may be measured from the DM-RS on the PSDCH.

Further, the user equipment outside the cell coverage measures the S-RSRP based on the SLSS and/or the DM-RS of the PSBCH/PSCCH/PSSCH. Thus, the user equipment may determine whether or not to be a synchronization source to perform the D2D relay operation.

Hereinafter, the D2D relay operation may be referred to simply as a relay operation, and a user equipment that performs D2D relay operation is called a relay user equipment. The relay user equipment may be located between the first user equipment and the second user equipment, and may relay signals between the first and second user equipments. Alternatively, a relay user equipment may be located between another user equipment and a network (cell/base station), and may relay signals between another user equipment and the network. Hereinafter, a relay user equipment is assumed to be a user equipment that relays signals between another user equipment and the network.

Figure 13:
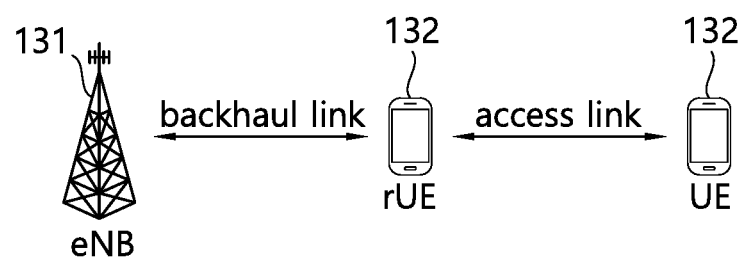
FIG. 13 illustrates a relay user equipment.

FIG. 13 illustrates a relay user equipment.

The relay user equipment 132 is a user equipment that provides network connectivity to the remote user equipment 133. The relay user equipment 132 is responsible for relaying signals between the remote user equipment 133 and the network 131. The remote user equipment 133 may be a user equipment (UE) that is difficult to communicate directly with the base station, even when the remote user equipment 133 is located outside of the coverage of the base station or within coverage thereof.

The relay user equipment maintains a link to a base station as well as a link to a common user equipment (e.g. remote UE). In this state, the relay user equipment may transmit information received from the base station to the common user equipment or may transmit information received from the common user equipment to the base station. In this connection, the link between the base station and the relay user equipment is called the backhaul link, and a link between the relay user equipment and the remote user equipment is also referred to as an access link. Further, a link used to perform direct communication between the user equipments without involvement of the base station may be defined as a D2D link or sidelink. That is, in FIG. 13, the access link may be sidelink.

Figure 14:
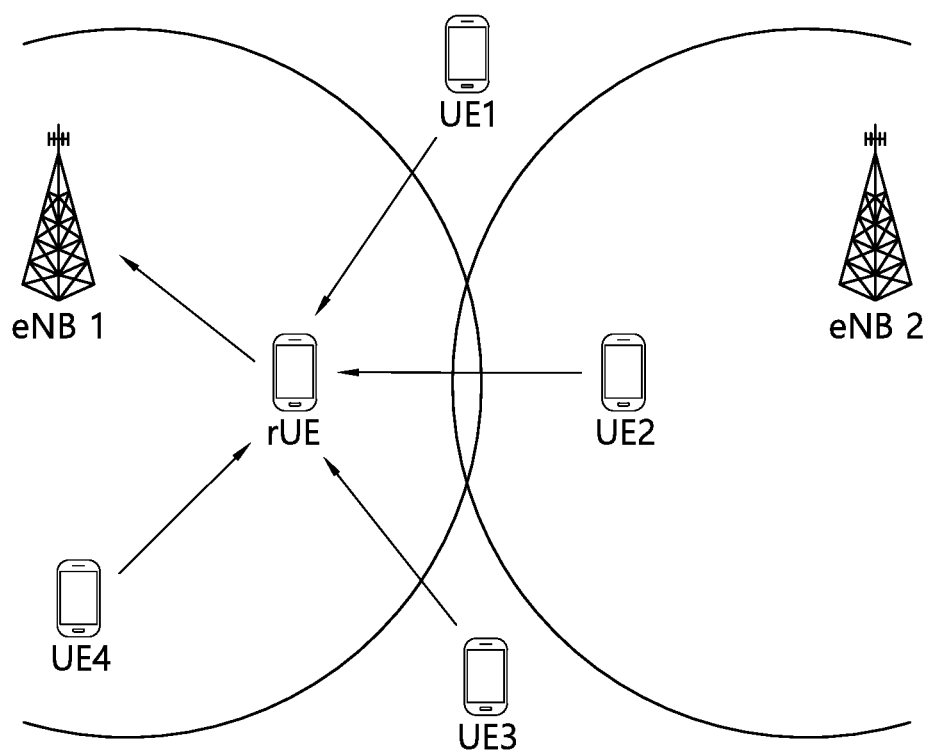
FIG. 14 illustrates the relationship between a relay user equipment and a remote user equipment.

FIG. 14 illustrates the relationship between a relay user equipment and a remote user equipment.

In FIG. 14, UE1 and UE3 are user equipments outside the coverage, and UE2 and UE4 are user equipments in the coverage, and rUE is a relay user equipment configured to perform relay operations. In this connection, the UE2 may be in the coverage of the second base station (eNB2) and may be outside the coverage of the first base station (eNB1). For the rUE, the first base station (eNB1) may be the serving cell.

The rUE may be configured as rUE by instruction of the first base station (eNB1) or coordination between rUEs. The rUE broadcasts a discovery signal, whereby neighboring UEs may be aware of the presence of the rUE. The rUE receives the D2D signal from the user equipment (i.e. UE4) in the serving cell network for uplink transmission, the user equipment (i.e. UE2) in the neighboring cell network, and the user equipments outside the coverage (i.e. UE1, UE3).

Figure 15:
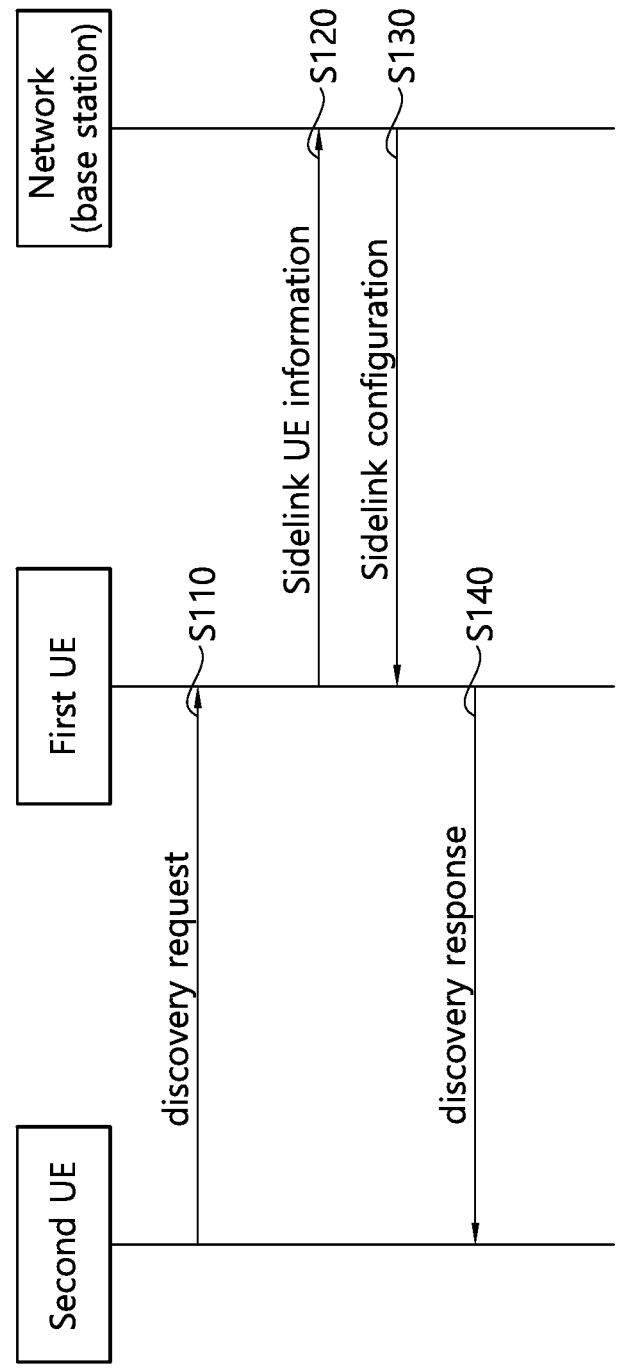
FIG. 15 illustrates an operation for providing a relay service by a relay user equipment.

FIG. 15 illustrates an operation for providing a relay service by a relay user equipment.

Referring to FIG. 15, a first user equipment attempts to provide a relay service between a second user equipment and a network. That is, the first user equipment is the relay user equipment.

When the first user equipment attempts to provide the D2D relay service between the second user equipment and the network, the first user equipment may receive a discovery request signal from the second user equipment (S110). To send a discovery response to the discovery request signal, the first user equipment needs to acquire the transmission resource. For this purpose, the first user equipment needs to transmit the sidelink user equipment (UE) information or the sidelink UE information to the base station (S120). In this connection, the sidelink user equipment (UE) information may include information indicating the number of discovery messages to be transmitted by the first user equipment (more specifically, the number of discovery messages to be transmitted in a separate manner).

In response to this, the base station provides the sidelink configuration to the first user equipment (S130). In this connection, the base station may configure the resources via the sidelink configuration in consideration of the number of discovery messages that the first user equipment informs. For example, when the number of discovery messages is large, the BS allocates a large amount of resources, whereas, when the number of discovery messages is small, the base station may allocate a small amount of resources.

According to the sidelink configuration, the first user equipment transmits a discovery response to the second user equipment (S140).

According to this operation, whenever the number of discovery messages to be transmitted by the first user equipment is changed, the sidelink user equipment or UE information must be transmitted, which may waste resources, which is inefficient. Especially, when the number of discovery message to be transmitted is changed frequently, waste of resources is worsened.

To solve this problem, according to the present invention, it is proposed to configure the relay user equipment so that the relay user equipment may omit operation indicating the number of discovery messages under certain conditions. For example, if the amount of change in the number of discovery messages that the relay user equipment wants to transmit is less than the threshold value, the relay user equipment may omit operation indicating the number of discovery messages even if the number of discovery messages changes. The number of separate discovery messages that the user equipment wants to transmit may be explicitly or implicitly known to the base station. For example, the sidelink user equipment (UE) information may include a parameter that indicates the number of resources required for the user equipment to send a discovery message (discovery announcement) every discovery period. The parameter may indicate the number of separate discovery messages to be transmitted by the user equipment every discovery period. Indicating the number of separate discovery messages to be transmitted by the user equipment via the above parameter may be an implicit method.

Figure 16:
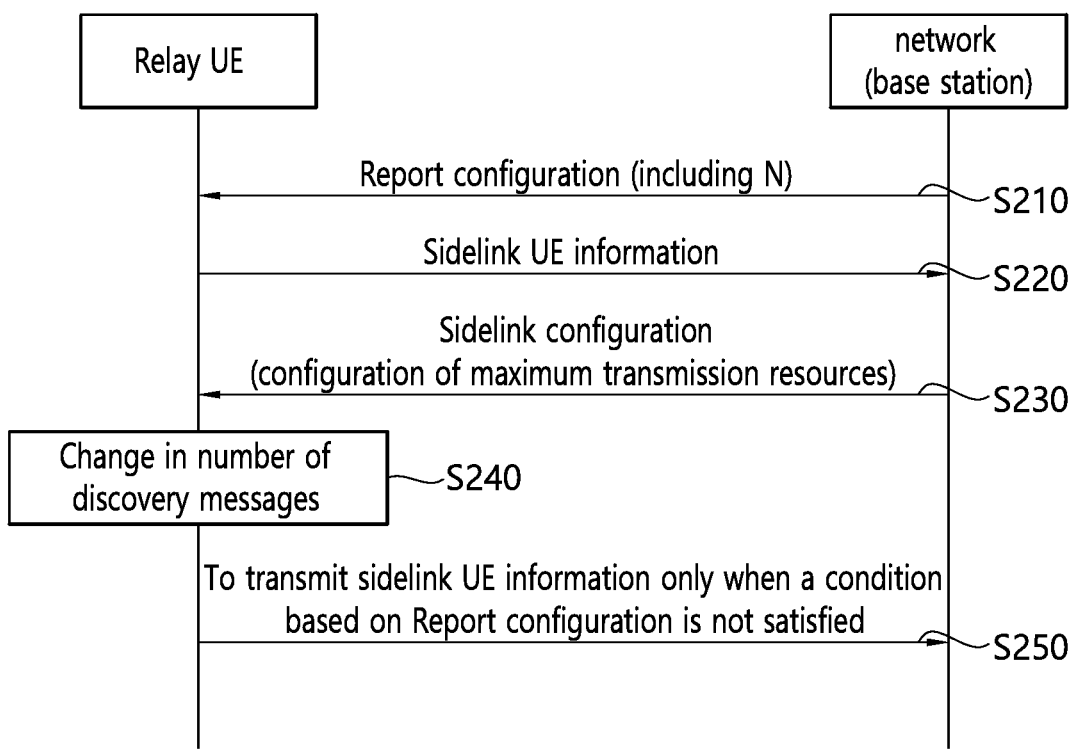
FIG. 16 shows an operation method of a relay user equipment according to one embodiment of the present invention.

FIG. 16 shows an operation method of a relay user equipment according to one embodiment of the present invention.

Referring to FIG. 16, a relay user equipment receives a report configuration from a network (base station) (S210). The report configuration may include at least one value (threshold value) for controlling the relay user equipment to omit operation reporting the number of discovery messages to the network. Let N be the value of the threshold value for convenience hereinafter.

In other words, the network may configure the threshold value for the relay user equipment so that the relay user equipment may omit the operation of reporting the number of discovery messages to the network. The network may configure the threshold value only for a user equipment that intends to provide a relay service.

The network may configure the threshold value via an upper layer signal such as RRC configuration or system information. The threshold value may be configured via a user equipment-specific dedicated message, for example, a sidelink configuration message.

The relay user equipment reports the sidelink user equipment (UE) information to the network, wherein the information includes the information indicating the number of discovery messages (more specifically, the number of separate discovery messages) to be transmitted by the relay user equipment to the network (S220).

The number of discovery messages (referred to as K) may be indicated by an upper layer of the user equipment, for example, the ProSe protocol layer. The user equipment stores the K.

The network transmits the sidelink configuration to the relay user equipment (S230). The sidelink configuration may configure a transmission resource corresponding to a maximum number of discovery messages that the relay user equipment may transmit.

When the number of discovery messages to be transmitted by the relay user equipment changes (S240), the relay user equipment does not trigger transmission of the sidelink user equipment (UE) information if the condition according to the report configuration is satisfied. That is, the sidelink user equipment (UE) information having a purpose of reporting a change in the number of discovery messages to be transmitted is not transmitted. Thus, the transmission of sidelink user equipment (UE) information for other purposes may not be omitted.

When the number of discovery messages to be transmitted by the relay user equipment changes (S240), the relay user equipment triggers transmission of the sidelink user equipment (UE) information if the condition according to the report configuration is not satisfied. In this connection, the sidelink user equipment (UE) information includes information indicating the changed number of the discovery message.

For example, it may be assumed that the number of discovery messages to be transmitted at time point T1 is K1. Further, let the number of discovery messages to be transmitted at time point T2 be K2. In this connection, when K2 is larger than or equal to (K1−N) and smaller than or equal to (K1+N), that is, when (K1−N)<K2<(K1+N), the sidelink user equipment (UE) information, including the information indicating K2, may not be reported to the network.

Alternatively, when (K1−N)<K2<(K1+N), the sidelink user equipment (UE) information, including the information indicating K2, may not be reported to the network.

Alternatively, when K2<(K1+N), the sidelink user equipment (UE) information, including the information indicating K2, may not be reported to the network.

Alternatively, when K2<(K1+N), the sidelink user equipment (UE) information, including the information indicating K2, may not be reported to the network.

Alternatively, when K2<(K1−N), the sidelink user equipment (UE) information, including the information indicating K2, may not be reported to the network.

The threshold values for controlling the omission of operations reporting the number of discovery messages to the network by the relay device may be defined as N_low and N_high. The N_low and N_high may be different values or the same value. Let the number of discovery messages to be transmitted at time point T1 be K1 and the number of discovery messages to be transmitted at time point T2 be K2. In this connection, when K2 is greater than or equal to (K1−N_low) and less than or equal to (K1+N_high), that is, when (K1−N_low)<K2<(K1+N_high), the sidelink user equipment (UE) information, including the information indicating K2, may not be reported to the network.

Alternatively, when (K1−N_low)<K2<(K1+N_high), the sidelink user equipment (UE) information, including the information indicating K2, may not be reported to the network.

If at least one of the above conditions is satisfied and K2 is greater than K1 (i.e., K1<K2), the user equipment may not report the K2 value to the base station. In this connection, the amount of resources for discovery message transmission as configured for the user equipment may be smaller than amount K2 of discovery messages. In this case, instead of sending K2 discovery messages at every discovery cycle, the user equipment may transmit the maximum number of discovery messages that can be transmitted using discovery message transmission resources currently configured for the user equipment. This may be referred to as so-called selective transmission. This may refer to a method of selecting a message to be transmitted in every discovery cycle. In this connection, the user equipment may randomly select a message to be sent every cycle. Alternatively, the discovery message to be transmitted may be selected so that the total number of transmissions of each separate message are similar between the separate messages in a particular time window. That is, it is possible to equalize the transmission probability of each separate message so that a fair transmission opportunity is provided for each separate message.

Hereinafter, a concrete example in which the present invention is applied to actual LTE/LTE-A will be described.

Figure 17:
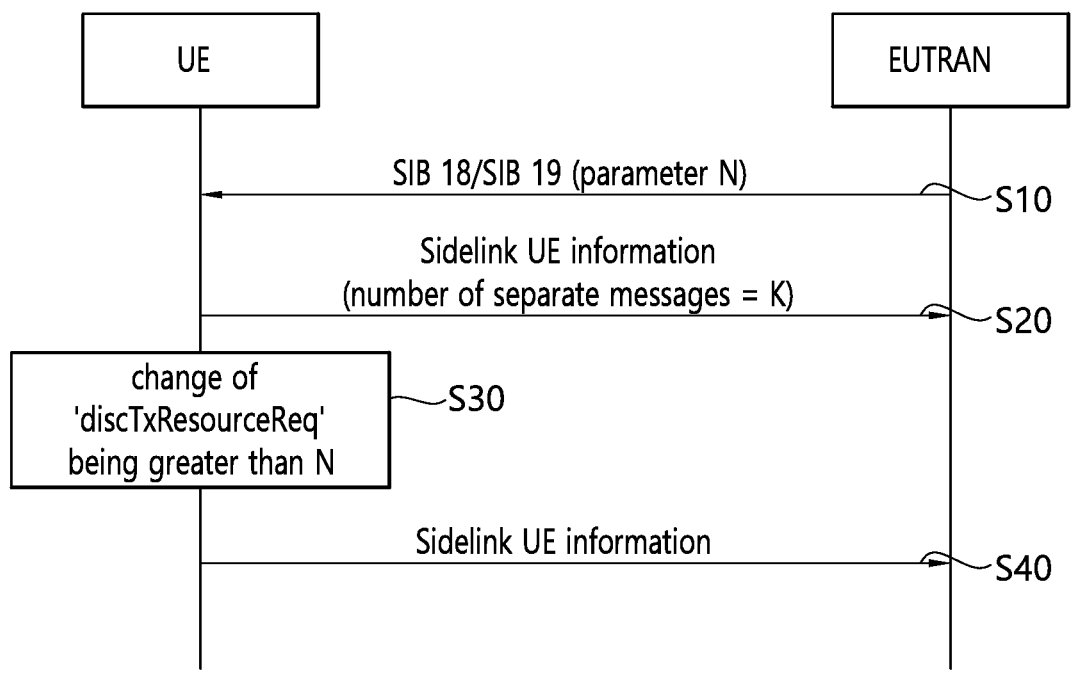
FIG. 17 shows an example of applying the present invention to LTE/LTE-A.

FIG. 17 shows an example of applying the present invention to LTE/LTE-A.

Referring to FIG. 17, an EUTRAN (corresponding to a network or a base station) provides the above-described parameter N to the user equipment via SIB18/SIB19 (S10). In this connection, N may be a threshold value to control the omission of the operation in which the relay user equipment reports the number of discovery messages to the network (that is, an operation for reporting the sidelink user equipment (UE) information to inform the number of discovery messages).

The following table may be an example of a system information block (SIB) 19 including the parameter N.

TABLE 2

```
-- ASN1START
SystemInformationBlockType19-r12 ::= SEQUENCE {
    discConfig-r12                              SEQUENCE {
        discRxPool-r12           SL-DiscRxPoolList-r12,
        discTxPoolCommon-r12     SL-DiscTxPoolList-r12          OPTIONAL,-- Need OR
        discTxPowerInfo-r12      SL-DiscTxPowerInfoList-r12         OPTIONAL,-- Cond Tx
        discSyncConfig-r12       SL-SyncConfigList-r12              OPTIONAL-- Need OR
        ControlDiscMessage       SL-ReportConfig
    }                                                           OPTIONAL,    - Need OR
    discInterFreqList-r12        SL-CarrierFreqInfoList-r12     OPTIONAL,-- Need OR
    lateNonCriticalExtension     OCTET STRING                                OPTIONAL,
    ...
}
SL-CarrierFreqInfoList-r12 ::=   SEQUENCE (SIZE (1..maxFreq)) OF SL-CarrierFreqInfo-r12
SL-CarrierFreqInfo-r12::=        SEQUENCE {
    carrierFreq-r12              ARFCN-ValueEUTRA-r9,
    plmn-IdentityList-r12                 PLMN-IdentityList4-r12          OPTIONAL -- Need OP
}
PLMN-IdentityList4-r12 ::= SEQUENCE (SIZE (1..maxPLMN-r11)) OF PLMN-IdentityInfo2-r12
PLMN-IdentityInfo2-r12 ::=    CHOICE {
    plmn-Index-r12                       INTEGER (1..maxPLMN-r11),
    plmnIdentity-r12                     PLMN-Identity
}
-- ASN1STOP
```

In the above Table 2, 'discInterFreqList' indicates neighboring frequencies at which discovery announcement is supported. 'discRxPool' indicates the resource on which that the device is allowed to receive the discovery announcement in RRC idle state or RRC connection state. 'discSyncConfig' indicates the configuration in which the device is allowed to send and receive synchronization signals. 'discTxPoolCommon' indicates the resource on which the device is allowed to send the discovery announcement in the RRC idle state. 'ControlDiscMessage' may be information providing a threshold value (N) for controlling the relay user equipment to omit operation reporting the number of discovery messages to the network.

The user equipment reports to the EUTRAN the sidelink user equipment (UE) information including information indicating the number (K) of separate messages to be transmitted (S20). As described above, the separate message to be transmitted by the user equipment may be, for example, the discovery message.

The following table may be an example of the sidelink user equipment (UE) information transmitted by the user equipment.

TABLE 3

```
-- ASN1START
SidelinkUEInformation-r12 ::=           SEQUENCE {
    criticalExtensions                  CHOICE {
        c1                              CHOICE {
            sidelinkUEInformation-r12           SidelinkUEInformation-r12-IEs,
            spare3 NULL, spare2 NULL, spare1 NULL
        },
        criticalExtensionsFuture                SEQUENCE { }
    }
}
SidelinkUEInformation-r12-IEs ::= SEQUENCE {
    commRxInterestedFreq-r12     ARFCN-ValueEUTRA-r9         OPTIONAL,
    commTxResourceReq-r12        SL-CommTxResourceReq-r12    OPTIONAL,
    discRxInterest-r12           ENUMERATED {true}           OPTIONAL,
    discTxResourceReq-r12        INTEGER (1..63)             OPTIONAL,
    lateNonCriticalExtension OCTET STRING                    OPTIONAL,
    nonCriticalExtension                 SEQUENCE { }        OPTIONAL
}
SL-CommTxResourceReq-r12 ::=            SEQUENCE {
    carrierFreq-r12              ARFCN-ValueEUTRA-r9         OPTIONAL,
    destinationInfoList-r12      SL-DestinationInfoList-r12
}
SL-DestinationInfoList-r12 ::=   SEQUENCE   (SIZE   (1..maxSL-Dest-r12))OF   SL-DestinationIdentity-r12
SL-DestinationIdentity-r12 ::=   BIT STRING (SIZE (24))
-- ASN1STOP
```

In the Table 3, 'commRxInterestedFreq' indicates the frequency at which the user equipment is interested in receiving the sidelink communication signal. 'commTxResourceReq' indicates the frequency at which the user equipment is interested in transmitting the sidelink communication signal and indicates the destination of the sidelink communication. 'discRxInterest' indicates that the user equipment is interested in monitoring the sidelink discovery announcement.

'discTxResourceReq' indicates the number of resources required from the user equipment at each discovery period for the user equipment to transmit the sidelink discovery announcement. This parameter is related to the number of separate discovery messages that the user equipment wants to transmit at each discovery period. That is, this parameter may be information indicating the number (K) of separate messages to be transmitted by the user equipment.

After transmission of the most recent sidelink user equipment (UE) information, the discovery announcement resources requested by the user equipment may be changed (that is, the parameter 'discTxResourceReq' may be changed) (S30). In this connection, if the change of 'discTxResourceReq' is greater than N (or if the value of 'discTxResourceReq' is larger than K by a certain value or more), the user equipment may again report the sidelink user equipment (UE) information to the network (S40). As mentioned above, N means a threshold value for controlling the relay user equipment to omit the operation of reporting the number of discovery messages to the network.

Figure 18:
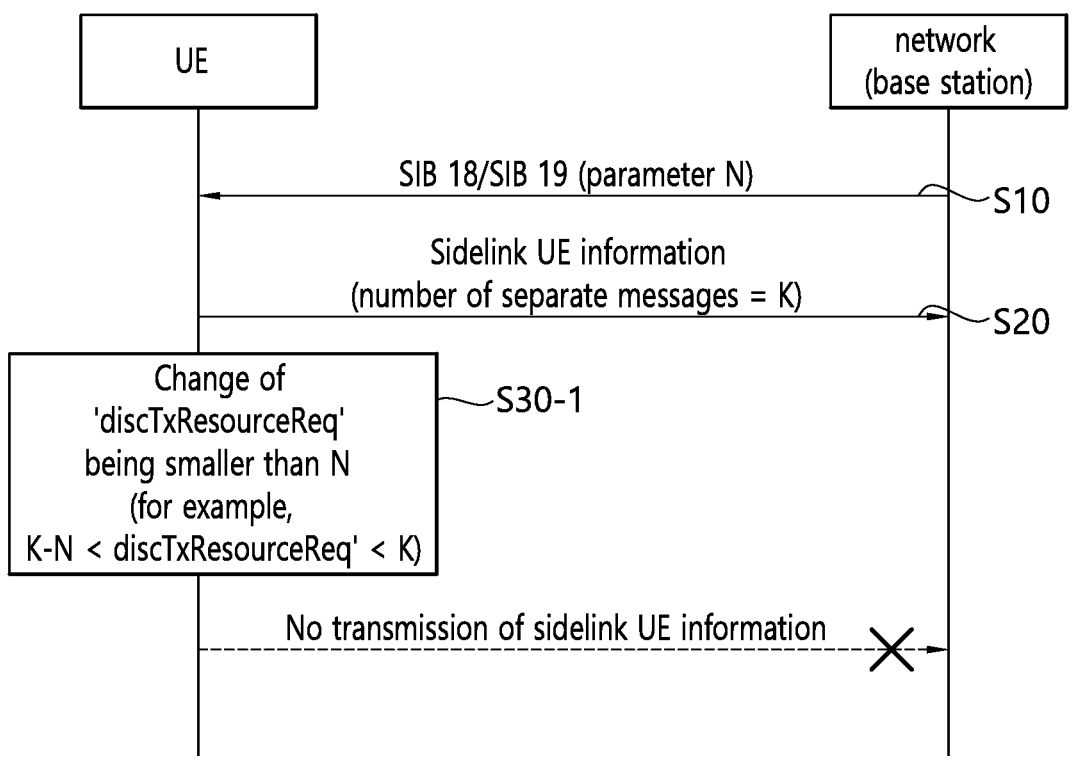
FIG. 18 is the same as FIG. 17 in terms of S10 to S20.

FIG. 18 shows another example of applying the present invention to LTE/LTE-A.

FIG. 18 is the same as FIG. 17 in terms of S10 to S20.

After transmission of the most recent sidelink user equipment (UE) information, when a discovery announcement resource required by the user equipment is changed, a change of information corresponding to the parameter 'discTxResourceReq' occurs. If the new discTxResourceReq value is smaller than K and larger than K−N (S30-1), unlike FIG. 17, the user equipment does not transmit new sidelink user equipment (UE) information to the network. Therefore, the number of reports of sidelink user equipment (UE) information by the user equipment is reduced.

In FIGS. 17 and 18, an example has been described in which the threshold value N for controlling the relay user equipment to omit the operation of reporting the number of discovery messages to the network is provided/configured via the system information. However, the present invention is not limited thereto. For example, the threshold value N may also be provided/configured via a user equipment-specific dedicated message such as a sidelink configuration message.

Figure 19:
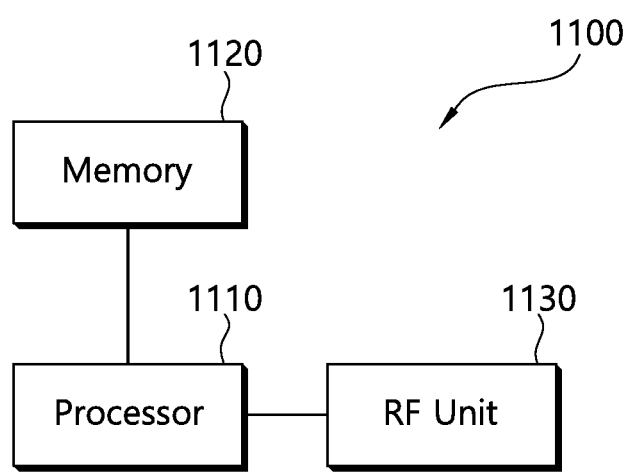
FIG. 19 is a block diagram illustrating a user equipment in which an embodiment of the present invention is implemented.

FIG. 19 is a block diagram illustrating a user equipment in which an embodiment of the present invention is implemented.

Referring to FIG. 19, a user equipment 1100 includes a processor 1110, a memory 1120, and a radio frequency unit 1130. Processor 1110 implements the proposed functionality, process and/or method. The RF unit 1130 may be coupled to the processor 1110 to transmit and receive RF signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for reporting sidelink user equipment (UE) information in a wireless communication system, the method performed by a UE and comprising:
receiving a threshold value and sidelink configuration information informing the UE of resources for discovery message transmission from a network;
based on a change in a number of separate discovery messages to be transmitted by the UE being equal to or greater than the threshold value, transmitting the sidelink UE information including the number of separate discovery messages to the network; and
based on the change being less than the threshold value and resources for the number of separate discovery messages to be transmitted being greater than the resources for discovery message transmission, transmitting randomly selected discovery messages among the separate discovery messages via the resources for discovery message transmission,
wherein based on the change being less than the threshold value, the UE transmits the sidelink UE information in case a purpose other than the number of separate discovery messages is present.

2. The method of claim 1, wherein determining whether or not the UE transmits the sidelink UE information based on the threshold value.

3. The method of claim 1,
wherein when a number of discovery messages to be transmitted by the UE at a first time point is K1, a number of discovery messages to be transmitted by the UE at a second time point is K2, and the threshold value is defined as N_low and N_high, and
wherein when (K1−N_low)<K2<(K1+N_high), the sidelink UE information is not transmitted by the UE.

4. The method of claim 1, wherein the sidelink UE information includes information (discTxResourceReq) informing a number of resources required for the UE to transmit a sidelink discovery signal in each discovery period.

5. The method of claim 4, wherein the information (discTxResourceReq) is associated with the number of separate discovery messages to be transmitted by the UE.

6. The method of claim 1, wherein the threshold value is received via system information.

7. A user equipment (UE) comprising:
a receiver and a transmitter; and
a processor, operatively coupled to the receiver and the transmitter, wherein the processor is configured to:
control the receiver to receive a threshold value and sidelink configuration information informing the UE of resources for discovery message transmission from a network;
based on a change in a number of separate discovery messages to be transmitted by the UE being equal to or greater than the threshold value, control the transmitter to transmit sidelink UE information including the number of separate discovery messages to the network; and
based on the change being less than the threshold value and resources for the number of separate discovery messages to be transmitted being greater than the resources for discovery message transmission, control the transmitter to transmit randomly selected discovery messages among the separate discovery messages via the resources for discovery message transmission,
wherein based on the change being less than the threshold value, the UE transmits the sidelink UE information in case a purpose other than the number of separate discovery messages is present.

8. The UE of claim 7, wherein determining whether or not the UE transmits the sidelink UE information based on the threshold value.

9. The UE of claim 7,
wherein when a number of discovery messages to be transmitted by the UE at a first time point is K1, a number of discovery messages to be transmitted by the UE at a second time point is K2, and the threshold value is defined as N_low and N_high, and wherein when (K1−N_low)≤K2≤(K1+N_high), the sidelink UE information is not transmitted by the UE.

10. The UE of claim 7, wherein the sidelink UE information includes information (discTxResourceReq) informing a number of resources required for the UE to transmit a sidelink discovery signal in each discovery period.

11. The UE of claim 10, wherein the information (discTxResourceReq) is associated with the number of separate discovery messages to be transmitted by the UE.

12. The UE of claim 7, wherein the threshold value is received via system information.

* * * * *